UNITED STATES PATENT OFFICE.

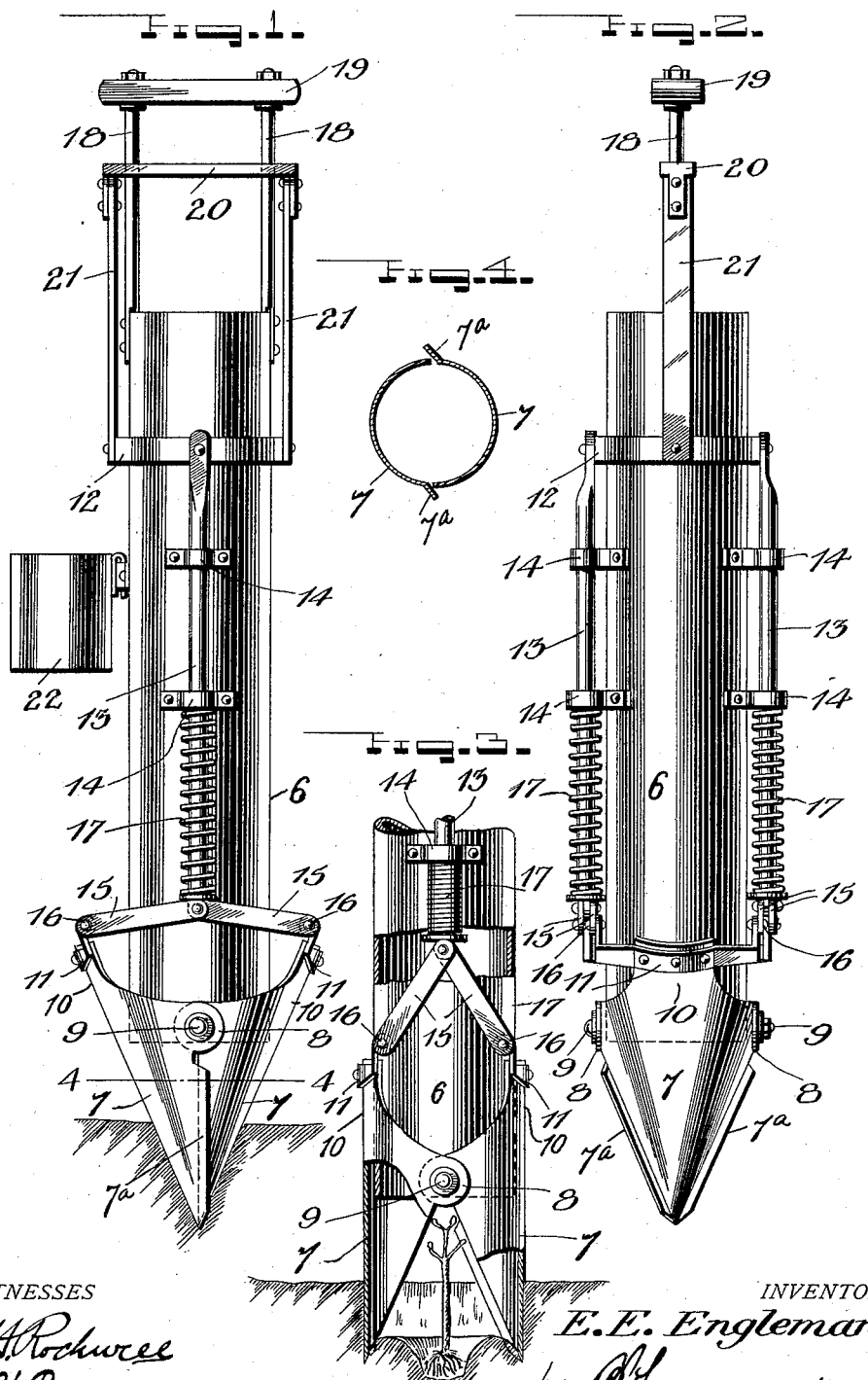

ERNEST E. ENGLEMAN, OF ROANOKE, VIRGINIA.

TRANSPLANTER.

1,077,822.  Specification of Letters Patent.  Patented Nov. 4, 1913.

Application filed February 19, 1913. Serial No. 749,390.

*To all whom it may concern:*

Be it known that I, ERNEST E. ENGLEMAN, a citizen of the United States, residing at Roanoke, in the county of Roanoke and State of Virginia, have invented new and useful Improvements in Transplanters, of which the following is a specification.

The present invention relates to means for setting out plants and the like, though it may be employed for other operations of an analogous character.

The primary object is to provide a simple transplanter that can be cheaply constructed, and yet is easily operated and effective in action.

The preferred embodiment of the invention is illustrated in the accompanying drawings, wherein:—

Figure 1 is a side elevation of a transplanter. Fig. 2 is a side elevation at right angles to Fig. 1. Fig. 3 is a longitudinal sectional view of the lower portion, showing the jaws open. Fig. 4 is a cross sectional view through the jaws.

Similar reference numerals designate corresponding parts in all the figures of the drawings.

In the embodiment illustrated, a plant-receiving tube 6 is employed, preferably formed of sheet metal, and having open ends. To the lower end of this tube is pivoted a pair of coöperating jaws 7 that are outwardly convexed and tapered, as shown. These jaws have ears 8, through which the pivots 9 are passed. They are also provided with upstanding portions 10 arranged on opposite sides of the tube, and having cross heads 11 secured thereto. By reference to Fig. 4, it will be noted that each jaw furthermore has one of its side margins outturned, as illustrated at 7ª, and this margin overlaps the adjacent straight margin of the opposite jaw.

A ring 12 surrounds the upper portion of the tube and reciprocates thereon. To this ring are secured rods 13 slidably mounted in guides 14 and disposed longitudinally of the tube. The lower ends of these rods are connected to the inner ends of toggle links 15, which are pivoted as shown at 16, to the ends of the cross heads 11. A set of these links is located on each side of the tube. A coiled spring 17 surrounds each of the rods 13, and is interposed between the links and the lower of the guides, thereby urging the links into a position to normally hold the jaws 7 closed.

Secured to the upper end of the tube 6 are spaced rods 18, having mounted on their upper ends a fixed hand grip 19. Another hand grip 20 is slidably mounted on the rods 18, being provided with openings through which said rods pass. This hand grip 20 has depending arms 21 secured to its ends, which are in turn fixed to the ring 12 midway between the rods 13. A plant-holding cup 22 is preferably fixed to one side of the plant-receiving tube 6.

By reference to Fig. 1, it will be noted that when the jaws are closed and the handle 20 in its lowermost position, the links 15 are substantially in alinement. To operate the device, the same is plunged downwardly into the loose earth, a plant is introduced through the upper end of the tube, and the hand grip 20 is then elevated. As a result, the links 15 will be drawn from their alined position to an angular relation, thus causing the jaws to open and the plant to be dropped into the opening. Consequently, when the transplanter is withdrawn, the earth will fall about the roots of the plant. It will be evident that this structure is very simple, and is made up of parts that can be cheaply manufactured. It is moreover easily operated, and in this connection, the arrangement of the links 15 is important. By having these links substantially alined or horizontal, when the jaws are closed, it requires very little power applied to the handle 20 to move the jaws, whereas if the links were in sharply angular relation when the jaws were closed, much more power would be necessary.

From the foregoing it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. In a transplanter, a plant-receiving tube, a pair of coacting jaws pivoted to the lower end thereof, a reciprocatory operating rod mounted longitudinally on the tube, and links pivoted to the jaws and to the rod, said links being substantially alined transversely of the tube when the jaws are closed and assuming an angular relation when the jaws are opened.

2. In a transplanter, the combination with a plant-receiving tube, of a pair of coacting jaws pivoted to the lower end thereof and having transversely disposed cross heads at their upper ends, reciprocatory rods mounted longitudinally on the tube, sets of links pivoted to the cross heads of the jaws and to the rods, and a common actuating handle connected to both rods.

3. In a transplanter, the combination with a tube, of jaws pivoted thereto, a ring slidably mounted on the tube, connections between the ring and jaws, and actuating means connected to the ring for reciprocating the same.

4. In a transplanter, the combination with a tube, of jaws pivoted thereto, a ring slidably mounted on the tube, connections between the ring and jaws, a hand grip, and rod connections between the ends of the hand grip and opposite sides of the ring.

5. In a transplanter, the combination with a plant-receiving tube, of jaws pivoted to the lower end thereof, a ring slidably mounted on the tube and surrounding the same, rods connected to the ring and located longitudinally on opposite sides of the tube, links connecting the jaws and rods, a fixed hand grip connected to the upper end of the tube, a sliding hand grip associated with the fixed hand grip, and connections between the ends of the sliding hand grip and the ring.

6. In a transplanter, the combination with a plant-receiving tube, of coacting jaws pivoted thereto, each jaw having a side marginal portion that overlaps the edge of the opposite jaw, and means for swinging the jaws.

7. In a transplanter, the combination with a plant-receiving tube, of jaws pivoted to the lower end thereof, said jaws each having an outturned margin that overlaps the edge of the adjacent jaw, and means for opening and closing the jaws.

In testimony whereof I have hereunto set my hand in presence of two subscribing witnesses.

ERNEST E. ENGLEMAN.

Witnesses:
J. E. GISH,
GEO. D. HUNTER.

---

Copies of this patent may be obtained for five cents each, by addressing the "Commissioner of Patents, Washington, D. C."